United States Patent [19]

Heine et al.

[11] E Re. 29,897

[45] Reissued Feb. 6, 1979

[54] LATCHING DEVICE

[75] Inventors: Henry Heine, Vernon; Irving Feinberg, Saddle Brook, both of N.J.

[73] Assignee: Presto Lock Company, Division of Walter Kidde & Comany, Inc., Elmwood Park, N.J.

[21] Appl. No.: 794,792

[22] Filed: May 9, 1977

Related U.S. Patent Documents

Reissue of:

[64] Patent No.: 3,908,416
Issued: Sep. 30, 1975
Appl. No.: 405,119
Filed: Oct. 10, 1973

[51] Int. Cl.[2] ..... E05B 65/52

[52] U.S. Cl. ..... 70/71; 70/13; 292/241; 292/359

[58] Field of Search ..... 70/69–76, 70/6–13; 292/106, 207, 241, 359

[56] References Cited

U.S. PATENT DOCUMENTS

| | | | |
|---|---|---|---|
| 2,514,980 | 7/1950 | Vincent | 70/70 |
| 3,020,742 | 2/1962 | Gehrie | 70/69 |
| 3,020,743 | 2/1962 | Gehrie | 70/69 |
| 3,390,555 | 7/1969 | Bloss | 70/69 |
| 3,434,313 | 3/1969 | Feinberg | 70/70 |
| 3,461,697 | 8/1969 | Gehrie | 70/71 |

FOREIGN PATENT DOCUMENTS

| | | | |
|---|---|---|---|
| 22781 | 4/1957 | Fed. Rep. of Germany | 70/70 |

*Primary Examiner*—Robert L. Wolfe
*Attorney, Agent, or Firm*—Shapiro and Shapiro

[57] ABSTRACT

A latching device for luggage or the like cooperable with a hasp is constructed so that a manually operable latch member is pivotally connected to a projection on a mounting plate for allowing the latch member to be rotated with respect thereto. A leaf spring biases the latch member into contact with the top surface of the projection. The projection includes stop surfaces for limiting rotation of the latch member in a first direction to a closed position wherein the latch member substantially overlies the mounting plate and for limiting rotation of the latch member in the opposite direction to an open position wherein the latch member is substantially perpendicular to the mounting plate. The leaf spring also biases a detent ball into contact with a surface of the latch member for releasably maintaining the latch member in the open and closed positions.

9 Claims, 12 Drawing Figures

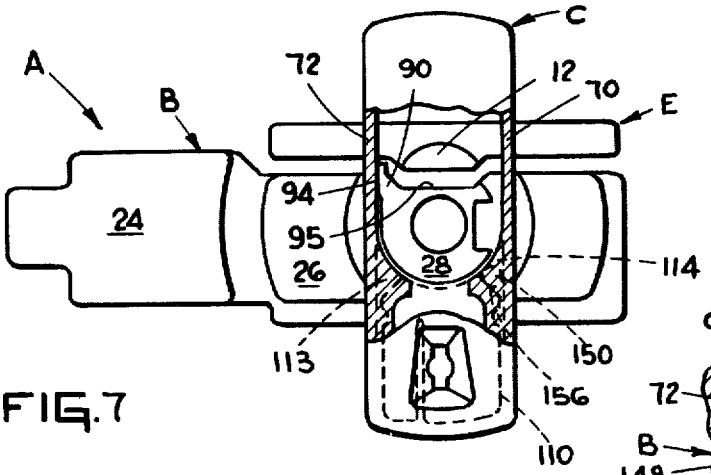
FIG. 7
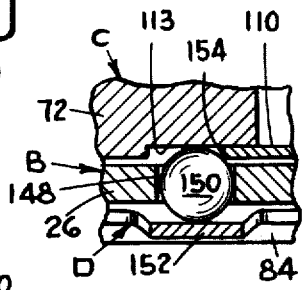
FIG. 6
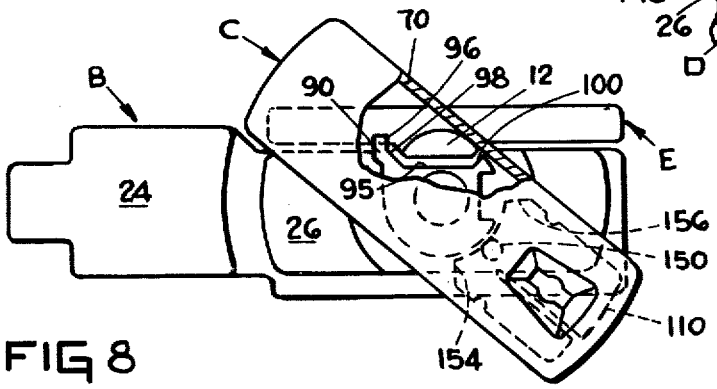
FIG 8
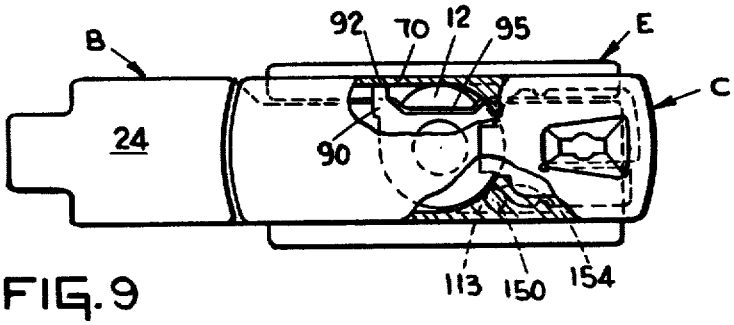
FIG. 9
FIG. 10
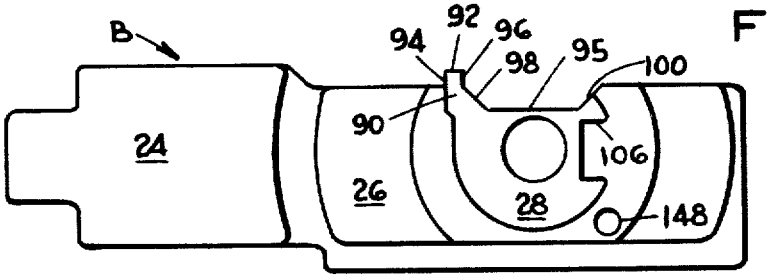
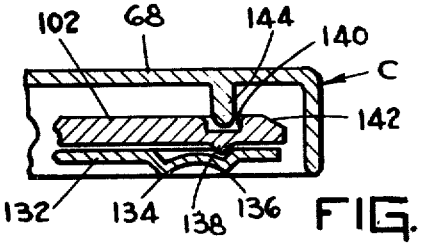
FIG. 11
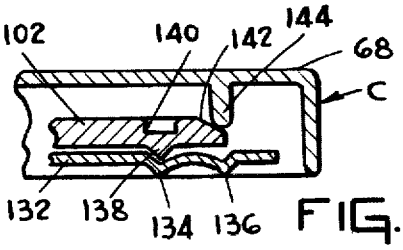
FIG. 12

LATCHING DEVICE

Matter enclosed in heavy brackets [ ] appears in the original patent but forms no part of this reissue specification; matter printed in italics indicates the additions made by reissue.

The invention relates to latching devices of the type including a rotatable latch member for use with luggage cases or the like, and is more particularly directed to improvements in latching devices of the type disclosed in Gehrie U.S. Pat. Nos. 3,020,742 and 3,020,743, granted Feb. 13, 1962.

BACKGROUND OF THE INVENTION

U.S. Pat. Nos. 3,020,742 and 3,020,743, granted Feb. 13, 1962 to Gehrie, disclose latching devices for releasably fastening together separable parts of a container or the like. Each latching device includes a pivot bar adapted to be attached to one of the separable parts. A latch member is pivotally connected to the pivot bar for engaging a hasp mounted on the other of the separable parts when the longitudinal axis of the latching member is perpendicular to the axis of the pivot bar and for drawing the hasp toward the pivot bar when the latch member is rotated to a closed position wherein the longitudinal axis is parallel to the axis of the pivot bar. Each pivot bar includes an upstanding boss for engaging a locking bolt which is slidably supported by the latch member for locking the latch member in closed position. Detent means are also provided for releasably maintaining the latch member in either one of the open and closed positions. In the '742 device, the detent means comprises a plate attached to the latch member and having indentations thereon which are cooperable with a detent ball resiliently supported by a leaf spring in an opening in the pivot bar. In the '743 device, a bent wire spring is secured to the latch member and is cooperable with a pin projecting from the pivot bar to provide a detent action.

SUMMARY OF THE INVENTION

A primary object of the invention is to provide a latching device of simplified and improved construction, and wherein the number of operations required for assembling the parts is reduced, thereby minimizing the cost of manufacturing the improved latching device.

A further object of the invention is to provide a latching device wherein a single spring functions both to resiliently urge together the latch member and the frame or plate upon which it is mounted and to releasably maintain the latch member in respective open and closed positions.

A latching device made in accordance with the invention comprises a mounting plate having a projection thereon and a manually operable latch member supported by and pivotally connected to the projection for allowing the latch member to be rotated with respect thereto. A leaf spring biases the latch member into contact with the top surface of the projection. The projection includes stop means for limiting rotation of the latch member in a first direction to the closed position wherein the latch member substantially overlies the mounting plate and for limiting rotation of the latch member in the opposite direction to the open position wherein the latch member is substantially perpendicular to the mounting plate. The leaf spring also biases detent means into contact with the latch member for releasably maintaining the latch member in either the open or closed position.

In addition to the foregoing objects and advantages, other advantages and improved results will be apparent from the following detailed description of a preferred embodiment of the invention.

BRIEF DESCRIPTION OF THE DRAWINGS

FIG. 6 is a cross-sectional view taken approximately in the plane of line 6—6 of FIG. 1 showing the detent ball, the other parts of the latching device being partially shown;

FIGS. 7, 8 and 9 are top plan views of the latching device with the latch member partly broken away for showing successive stages and relationships of the parts as the latch member is moved from unlatched position to latched position;

FIG. 10 is a top plan view of the mounting plate or frame of the latching device;

FIG. 11 is a longitudinal cross-sectional view taken approximately in the plane of line 11—11 of FIG. 1, showing the locking bolt in unlocked position; and FIG. 12 is a view similar to FIG. 11 except that the locking bolt is in locked position.

DESCRIPTION OF THE PREFERRED EMBODIMENT

Figure 1:
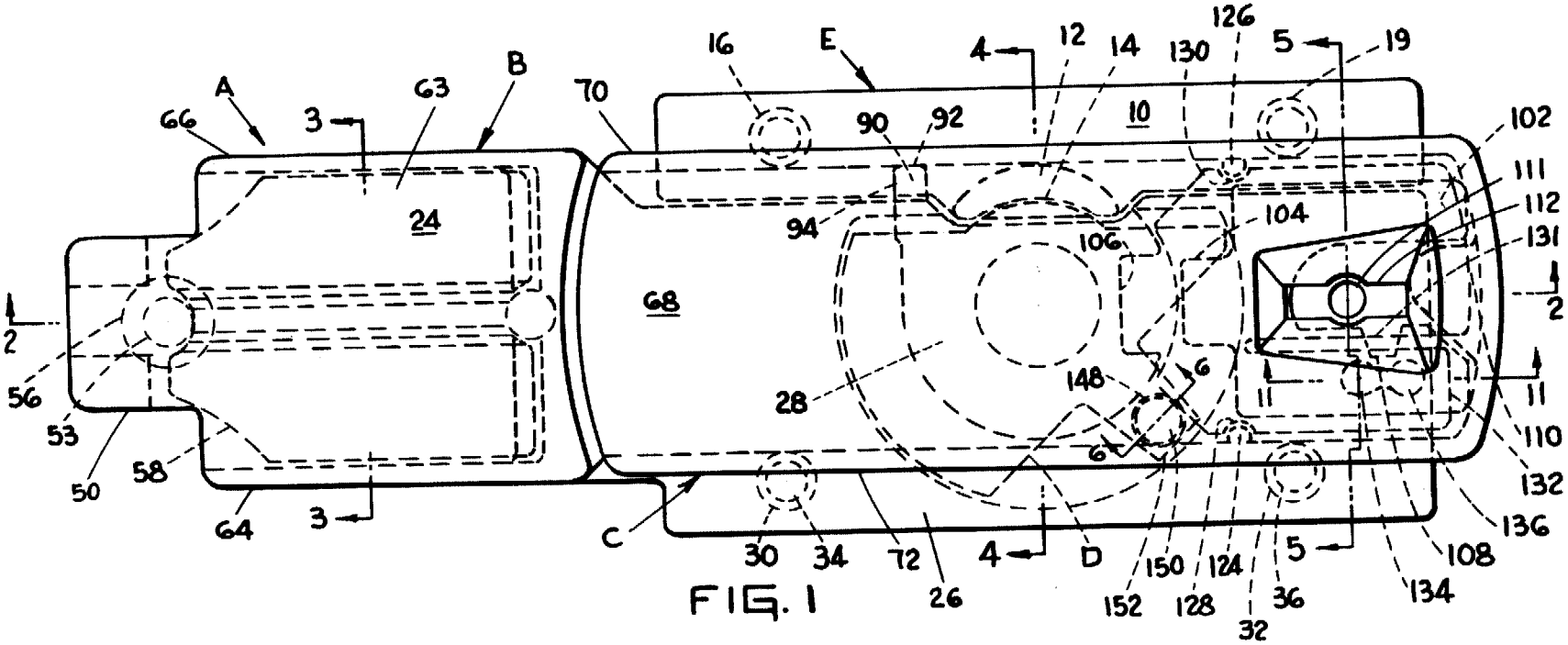
FIG. 1 is a top plan view of a latching device made in accordance with the invention, this view showing the latching device associated with a hasp and latched thereto.
Figure 2:
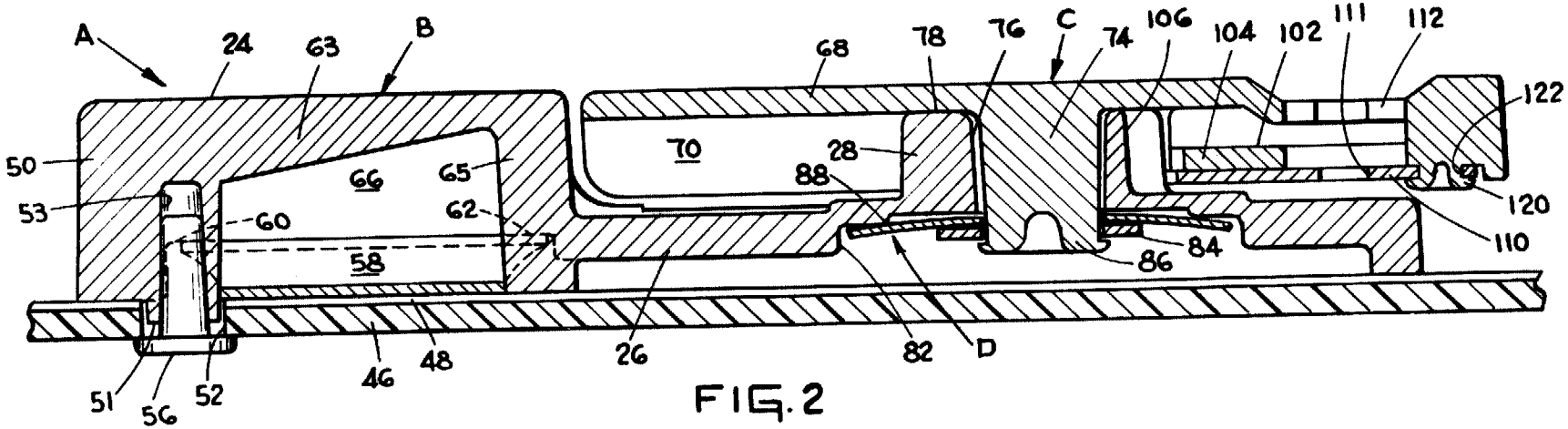
FIG. 2 is a longitudinal cross-sectional view taken approximately in the plane of line 2—2 of FIG. 1, this view additionally showing the latching device mounted on the wall of a luggage case section.
Figure 4:
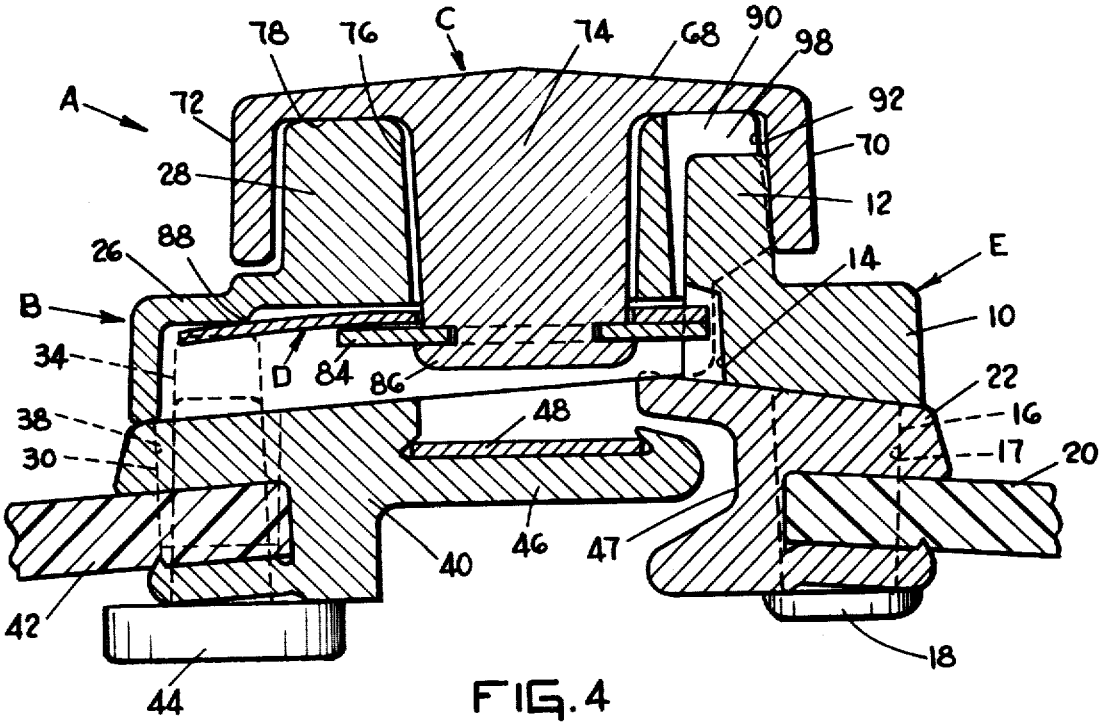
FIG. 4 is a transverse cross-sectional view taken approximately in the plane of line 4—4 of FIG. 1, this view additionally showing the latching device and the hasp mounted on the walls of cooperable luggage case sections.

Referring to FIGS. 1, 2 and 4 of the drawings, a latching device A includes a frame or mounting plate B and a latch member C which is pivotally connected thereto, the latch member being cooperable with a hasp E. A leaf spring D is provided for biasing the latch member C against the mounting plate B. For convenience of manufacture and assembly, it is preferred that the frame, latch member and hasp be made by die casting these parts.

The hasp E may be of usual or known construction and may comprise an elongated base 10 having thereon an upstanding boss 12. As shown in FIG. 4, the base 10 of the hasp is further provided with a recess 14 on the side which faces the latching device A when the latch is in closed position. The base 10 further includes a pair of spaced connecting studs 16 and 19 for connecting the hasp to the edge of a luggage case section or the like. As also shown in FIG. 4, the stud 16 is received by an opening 17 extending through luggage section 20 and valance member 22 supported thereon and has an end portion 18 which is headed over to attach the hasp E to valance 22. Although not shown, stud 19 is attached to luggage section 20 and valance member 22 in the same manner.

Referring to FIGS. 1 and 2, frame B includes a portion 24 adapted for connection with a carrying handle, a base 26, and an elevated portion or projection 28 extending upwardly from base 26. Frame B further includes means for attaching the latching device to the other of the luggage sections. Referring to FIG. 1, extending downwardly from the base 26 of frame B are two connecting studs 30 and 32 having tapered openings 34 and 36 respectively. As shown in FIG. 4, stud 30 is received by an opening 38 which extends through valance member 40 and luggage section 42 to which the valance member is attached. The opening 34 in stud 30 receives a headed, tapered rivet 44 for attaching latching device A to the luggage section 42. Although not shown, it will be apparent that stud 32 of frame B is similarly connected to the luggage section 42. FIG. 4 also shows that valance member 40 includes a projecting portion 46 which is receivable by recess 47 in valance member 22 and to which is connected a decorative insert 48 which may be selected to match the color of luggage sections 20 and 42.

Referring to FIGS. 1, 2 and 4, latch member C is pivotally connected to projection 28 of frame B of the latching device. Latch member C includes a substantially planar top portion 68 and pair of spaced sides 70 and 72. Extending downwardly from the center of top portion 68 is a boss 74 which is received by an opening 76 in projection 28 of frame B.

Latching device A further includes a leaf spring D between means provided by the frame and means provided by the latch member for biasing the latch member against projection 28 of the frame. FIG. 2 shows leaf spring D attached to boss 74 of latch member C and received by a recess 82 in the bottom of base 26 of the frame for biasing top portion 68 of the latch member into contact with surface 78 of projection 28. As best shown in FIG. 1, leaf spring D is substantially in the form of a disc, part of which is cut away for forming a radially extending finger 152 which provides detent action for latch member C in a manner which will be discussed later. Referring to FIGS. 2 and 4, the leaf spring is connected to boss 74 of the latch member C by means of annular washer 84 which is secured thereto by heading over the end 86 of boss 74 and is flexed to contact a shoulder 88 in the recess 82 for providing axial tension to the latch member.

As shown in FIGS. 1, 4, and 7–10, projection 28 of frame B includes a stop 90 which extends outwardly from projection 28 on the hasp side of the frame. A first surface 92 on stop 90 contacts side portion 70 of the latch member C when the latch member is in the closed position, as shown in FIGS. 1, 4 and 9. A second surface 94 on stop 90 is adapted for contacting side portion 72 of the latch member C when the latch member is in the open position, as shown in FIG. 7. Referring to FIG. 8, in addition to limiting rotation of latch member C to the open and closed positions, stop 90 acts to guide boss 12 of hasp E into its latched position opposite surface 95 on the projection 28 as the hasp is moved toward the frame for latching. Specifically, surfaces 96 and 98 on stop 90 are cooperable with boss 12 of the hasp for directing the boss into the latched position shown in FIG. 9. Surface 100 of projection 28 also acts to guide boss 12 into its latched position.

Figure 5:
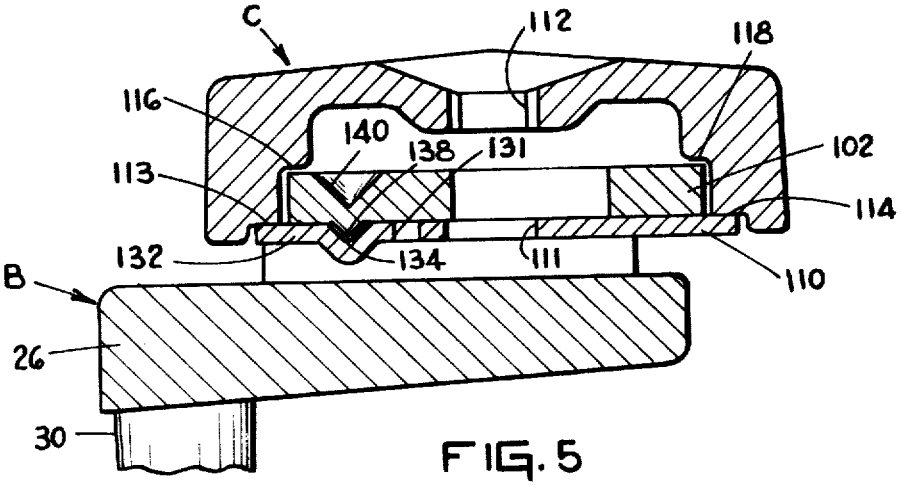
FIG. 5 is a transverse cross-sectional view taken approximately in the plane of line 5—5 of FIG. 1, one of the connecting studs being partially shown.

Referring to FIGS. 1, 2 and 5, latch member C includes a key-actuated locking bolt 102 having an end portion 104 which is cooperable with recess 106 in projection 28 for enabling the latch member to be locked in the closed position. Bolt 102 includes a notch 108 adapted to be engaged by a key (not shown) for moving the bolt along the longitudinal axis of the latch member C. As shown in FIG. 5, a bolt cover plate 110 contacts shoulders 113 and 114 of latch member C and is cooperable with shoulders 116 and 118 of the latch member for securing bolt 102 in the latch member with a small amount of clearance so that the bolt may be moved along the longitudinal axis of the latch member C. An opening 111 is provided in bolt cover plate 110 for receiving the end portion of a key which may be inserted in the opening 112 in top surface 68 of latch member C.

Bolt cover plate 110 is attached to latch member C in a manner sufficient to furnish a suitable connection of the parts. For example, as shown in FIG. 2, latch member C may include a stud 12 which is received by an opening 122 in the bolt cover plate and is headed over to secure one end of the cover plate to the latch member. As shown in FIG. 1, extending downwardly from latch member C are two studs 124 and 126 which are received by notches 128 and 130 respectively in bolt cover plate 110 and are headed over to secure the bolt cover plate to the latch member at these points.

For releasably maintaining the key-actuated locking bolt 102 in either the locked or unlocked position, detent means are provided. Referring to FIGS. 1 and 5, the bolt cover plate 110 has a longitudinally extending slot 131 to provide a resilient section 132 having longitudinally spaced indentations 134 and 136. As shown in FIG. 5, which is a cross-sectional view taken through indentation 134, locking bolt 102 is provided with a projection 138 which is adapted to be received by one or the other of indentations 134 and 136 in the bolt cover plate for positioning the bolt in either the locked or the unlocked position. Referring to FIGS. 5, 11 and 12, the upper surface of the bolt 102 is further provided with an indentation 140 and a sloped surface 142, both of which are cooperable with a pin 144 which extends downward from top portion 68 of latch member C for providing detent action. When the bolt 102 is in the unlocked position, pin 144 is received by indentation 140 on the bolt, as shown in FIG. 11, and projection 138 of the bolt is received by indentation 136 on section 132 of the bolt cover plate. However, when locking bolt 102 is in the locked position, as shown in FIG. 12, the downwardly extending projection 138 of the locking bolt is received by indentation 134 on section 132 of the bolt cover plate and pin 144 contacts surface 142 of the bolt member for releasably maintaining the bolt in that position. Bolt cover plate section 132 flexes to resiliently oppose movement of bolt 102 between the locked and unlocked positions.

Detent means are also provided for releasably maintaining rotatable latch member C in the open and closed positions. As shown in FIGS. 1 and 6, base 26 of frame B includes an opening 148 in which is positioned a ball 150. Leaf spring D includes an extended finger 152 which forces ball 150 against the underside of latch member C. Referring to FIGS. 6 and 9, when the latch member is in the closed position, ball 150 contacts latch member surface 113, which is shown in FIGS. 5 and 6 as one of the surfaces with which bolt cover plate 110 is engaged.

Similarly, when the latch member C is in the open position shown in FIG. 7, ball 150 contacts surface 114, which is shown in FIG. 5 as the other surface with which bolt cover plate 110 is engaged. However, as shown in FIG. 7, ball 150 rides on bolt cover plate 110 as the latch member C is rotated between the open and closed positions, thereby causing ball 150 to be displaced downwardly (with respect to its position when the latch member is either open or closed) by an amount equal to the thickness of the bolt cover plate. This downward movement of ball 150 is resiliently opposed by spring finger 152, which provides detent action for latch member C in the following manner. Referring to FIG. 9, when latch member C is in the closed position, ball 150 rests on surface 113 of latch member C and also resiliently contacts edge 154 of bolt cover plate 110, as shown in FIG. 6, for thereby maintaining side 70 of the latch member in contact with surface 92 on stop 90 of frame B. Similarly, when the latch member C is in the open position, shown in FIG. 7, ball 150 rests on surface 114 of the latch member and cooperates with edge 156 of bolt cover plate 110 for thereby maintaining side 72 of the latch member in contact with surface 94 on stop 90 of the frame. Rotation of latch member C out of the open or closed position requires that sufficient torque be applied thereto to move ball 150 against spring finger 152 a distance equal to the thickness of the bolt cover plate 110 to thereby enable the ball to ride on the bolt cover plate.

The manner in which the latching device A engages the hasp B and draws it into its latched position will now be described with reference to FIGS. 7, 8 and 9. In the position shown in FIG. 7, the boss 12 of hasp E may be moved between sides 70 and 72 of latch member C and toward surface 95 of the projection 28 of the frame B. When the boss 12 is in close proximity to surface 95 of projection 28, latch member C is rotated to effect latching, thereby causing side 70 of the latch member to engage boss 12, as shown in FIG. 8. As the latch member is further rotated, side 70 forces boss 12 generally in the direction of surface 95 of projection 28. However, if the boss 12 is not positioned directly opposite surface 95, surfaces 98 and 100 on projection 28 will direct the boss 12 to that position as side 70 of latch member C pulls the boss toward the frame B. When the latch member is in the closed position, shown in FIG. 9, the boss 12 will be held in the latched position by the side 70 of latch member C and by surfaces 95, 98 and 100 of projection 28 of frame B. The hasp is released by latching device A when the latch member C is rotated to the open position, as shown in FIG. 7.

Figure 3:
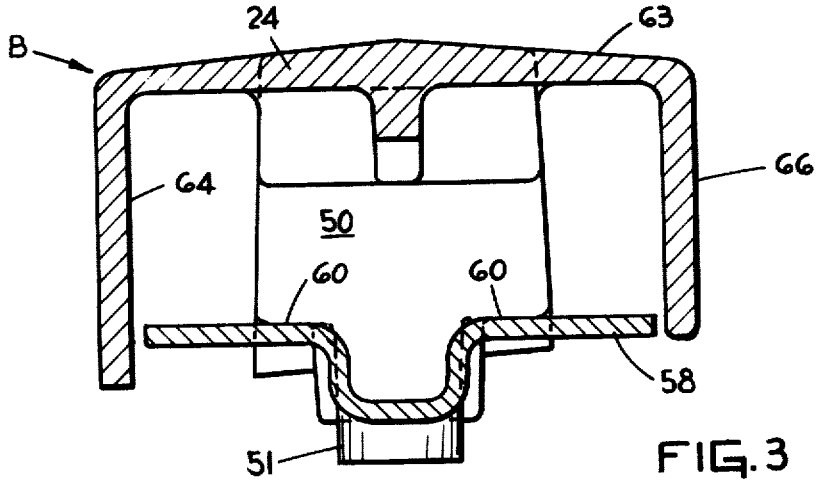
FIG. 3 is a transverse cross-sectional view taken approximately in the plane of line 3—3 of FIG. 1.

As shown in FIGS. 1, 2 and 3, frame B may further include a portion 24 adapted for connection with a carrying handle. Handle connecting portion 24 includes a connecting post 50 around which a loop connected to the end of a carrying handle (not shown) may be connected. A connecting stud 51 projects downwardly from post 50 of frame B and is received by an opening 52 in projecting portion 46 and insert 48 of valance member 40 which is attached to suitcase section 42. An opening 53, which extends through stud 51 and into portion 24 of frame B, receives a screw 56 for securely mounting post 50 of the frame B on projecting portion 46 of valance member 40.

A washer 58 is secured against surfaces 60 and 62 of the handle connecting portion 24 by the action of decorative insert 48 of valance member 40 which abuts the bottom surface of washer 58 when the latching device A is connected to the valance member. As shown in FIGS. 2 and 3, the washer 58 cooperates with top portion 63, side portions 64, 65 and 66, and post 51 of handle connection portion 24 for providing a substantially enclosed housing for receiving the connecting loop of the handle (not shown) when the handle is not being used.

It is believed that the advantages and improved results furnished by the latching device of the invention will be apparent from the foregoing description of a preferred embodiment thereof. Various changes and modifications may be made without departing from the spirit or scope of the invention, as sought to be defined in the following claims.

We claim:

[1. A latching device cooperable with a hasp, the latching device comprising:

a frame having a projection thereon;

a manually operable latch member pivotally mounted on the projection, the latch member being adapted to engage a hasp and draw the hasp toward the frame as the latch member is rotated in one direction to a closed position wherein the latch member substantially overlies the frame and to release the hasp as the latch member is rotated in the opposite direction to an open position wherein the latch member is substantially perpendicular to the frame; and a leaf spring cooperable with means provided by the frame and with means provided by the latch member to bias the latch member toward the frame and against said projection.]

[2. A latching device as set forth in claim 1, wherein the projection has an opening therethrough and the latch member includes a boss extending through said opening, the leaf spring having an opening through which the boss extends.]

[3. A latching device as set forth in claim 1, wherein the latch member comprises a top wall having two spaced side walls, the projection having limiting means cooperable with each of the side walls for limiting rotation of the latch member in said one direction to the closed position and in said opposite direction to the open position.]

[4. A latching device as set forth in claim 3, wherein one of the side walls is cooperable with a hasp for drawing the hasp toward the frame as the latch member is rotated in said one direction to the closed position.]

[5. A latching device as set forth in claim 1, including a detent ball positioned in an opening in the frame, wherein the leaf spring biases the detent ball into contact with the latch member for releasably maintaining the latch member in either one of the open and closed positions.]

[6. A latching device as set forth in claim 1, further comprising a bolt cover plate attached to the latch member for slidably supporting a locking bolt in the latch member, the locking bolt being cooperable with means provided by the projection for releasably locking the latch member in closed position.]

[7. A latching device as set forth in claim 6, including a detent ball positioned in an opening in the frame, wherein the bolt cover plate is cooperable with the detent ball for releasably maintaining the latch member in either one of open and closed positions, the detent ball being biased into contact with the bolt cover plate by the leaf spring.]

[8. A latching device as set forth in claim 2, wherein the latch member comprises a top wall having two spaced side walls, the projection having limiting means cooperable with each of the side walls for limiting rotation of the latch member in said one direction to the closed position and in said opposite direction to the open position, one of the side walls being cooperable with a hasp for drawing the hasp toward the frame as the latch member is rotated in said one direction to the closed position.]

[9. A latching device as set forth in claim 2, wherein the leaf spring is held between the frame and a washer connected to the end of the boss.]

[10. A latching device cooperable with a hasp, the latching device comprising:

a frame having a base portion and a projection on the base portion;

a manually operable latch member pivotally mounted on the projection, the latch member being adapted to engage a hasp and draw the hasp toward the frame as the latch member is rotated in one direction to a closed position wherein the latch member substantially overlies the frame and the latch member being adapted to release the hasp as the latch member is rotated in the opposite direction to an open position wherein the latch member is substantially perpendicular to the frame; and limiting means provided by the projection and cooperable with the latch member for limiting rotation of the latch member in said first direction to the closed position and for limiting rotation of the latch member in said opposite direction to the open position.]

[11. A latching device as set forth in claim 10, wherein the latch member comprises a top wall which abuts the projection for rotatably supporting the latch member thereon and a pair of spaced side walls extending from the top wall, the side walls being cooperable with the limiting means on the projection for limiting rotation of the latch member in one direction to the closed position and in the opposite direction to the open position.]

[12. A latching device as set forth in claim 11, wherein the latch member is adapted to receive a hasp between the side walls when the latch member is in the open position, and wherein one of the side walls is adapted to engage the hasp and draw the hasp toward the frame as the latch member is rotated in said one direction to the closed position.]

[13. A latching device as set forth in claim 12, wherein said limiting means comprises means extending outwardly from the projection on the hasp side of the frame, and wherein the outwardly extending means is cooperable with the one side wall of the latch member for guiding the hasp into its latched position when the latch member has engaged the hasp and is manually rotated in said first direction toward the closed position.]

[14. A latching device as set forth in claim 10, further comprising a bolt cover plate attached to the latch member for slidably supporting a locking bolt in the latch member, the locking bolt being cooperable with means provided by the projection for releasably locking the latch member in closed position.]

[15. A latching device as set forth in claim 14, further comprising a detent ball resiliently supported in an opening in the frame by the leaf spring and cooperable with the bolt cover plate for releasably maintaining the latch member in either one of the open and closed positions.]

*16. A latching device cooperable with a hasp, the latching device comprising a frame having a projection integral therewith, the projection having an opening therethrough, a rotatable latch member, the latch member including a boss extending through said opening to provide a pivotal mounting for the latch member, the latch member being adapted to engage the hasp and draw the hasp toward the frame as the latch is rotated in one direction to a closed position wherein the latch member substantially overlies the frame and to release the hasp as the latch member is rotated in the opposite direction to an open position, wherein the latch member is substantially perpendicular to the frame, the latch member having a top wall and two spaced side walls, the projection having respective means cooperable with each of the side walls for limiting rotation of the latch member in said one direction to the closed position and in said opposite direction to the open position, and a leaf spring cooperable with means provided by the frame and with means provided by the latch member to bias the latch member against said projection, the leaf spring having an opening through which the boss extends.*

*17. A latching device as set forth in claim 16, wherein one of the side walls is cooperable with the hasp for drawing the hasp toward the frame as the latch member is rotated in said one direction to the closed position.*

*18. A latching device as set forth in claim 16, including a detent ball positioned in an opening in the frame, and wherein the leaf spring biases the detent ball into contact with the latch member for releasably maintaining the latch member in either one of the open and closed positions.*

*19. A latching device as set forth in claim 16, further comprising a bolt cover plate attached to the latch member for slidably supporting a locking bolt in the latch member, the locking bolt being cooperable with means provided by the projection for releasably locking the latch member in closed position.*

*20. A latching device as set forth in claim 19, including a detent ball positioned in an opening in the frame, and wherein the bolt cover plate is cooperable with the detent ball for releasably maintaining the latch member in either one of open and closed positions, the detent ball being biased into contact with bolt cover plate by the leaf spring.*

*21. A latching device as set forth in claim 20, wherein the leaf spring is held between the frame and a washer connected to the end of the boss.*

*22. A latching device as set forth in claim 16, wherein said respective means are surfaces on means extending outwardly from the projection on the hasp side of the frame, and wherein the outwardly extending means is cooperable with the one side wall of the latch member for guiding the hasp into its latched position when the latch member has engaged the hasp and is manually rotated in said one direction toward the closed position.*

*23. A latching device as set forth in claim 22, further comprising a bolt cover plate attached to the latch member for slidably supporting a locking bolt in the latch member, the locking bolt being cooperable with the projection for releasably locking the latch member in closed position.*

*24. A latching device as set forth in claim 23, further comprising a detent ball resiliently supported in an opening in the frame by the leaf spring and cooperable with the bolt cover plate for releasably maintaining the latch member in either one of the open and closed positions.*

* * * * *